United States Patent [19]

Conley

[11] 4,103,401

[45] Aug. 1, 1978

[54] SHEET GRIPPING ASSEMBLY

[76] Inventor: John L. Conley, 3870 Chino Ave., Chino, Calif. 91710

[21] Appl. No.: 765,098

[22] Filed: Feb. 3, 1977

[51] Int. Cl.² .............................................. A44B 21/00
[52] U.S. Cl. .................................. 24/243 K; 160/392
[58] Field of Search ............... 24/243 K, 72.5, 30.5 R, 24/30.5 L; 160/327, 328, 329, 391, 392, 393

[56] References Cited

U.S. PATENT DOCUMENTS

| 1,362,651 | 12/1920 | Towns | 24/243 K |
|---|---|---|---|
| 1,484,382 | 2/1924 | Allitt | 160/392 |
| 3,426,412 | 2/1969 | Streng et al. | 24/243 K |

FOREIGN PATENT DOCUMENTS

| 519,561 | 12/1955 | Canada | 160/391 |
|---|---|---|---|
| 811,444 | 8/1951 | Fed. Rep. of Germany | 24/30.5 R |
| 719,685 | 2/1966 | Italy | 24/243 K |

Primary Examiner—Gilliam Paul R.
Assistant Examiner—Kenneth J. Dorner
Attorney, Agent, or Firm—Boniard I. Brown

[57] ABSTRACT

A sheet gripping assembly for thin pliable sheet material, such as plastic film, having a laterally opening channel-like base member and a pair of sheet gripping members insertable into the base member channel through its open side to grip sheet material in the channel in a manner which precludes dislodging of the gripping members from the channel by tension in the sheet material.

8 Claims, 7 Drawing Figures

U.S. Patent  Aug. 1, 1978  4,103,401
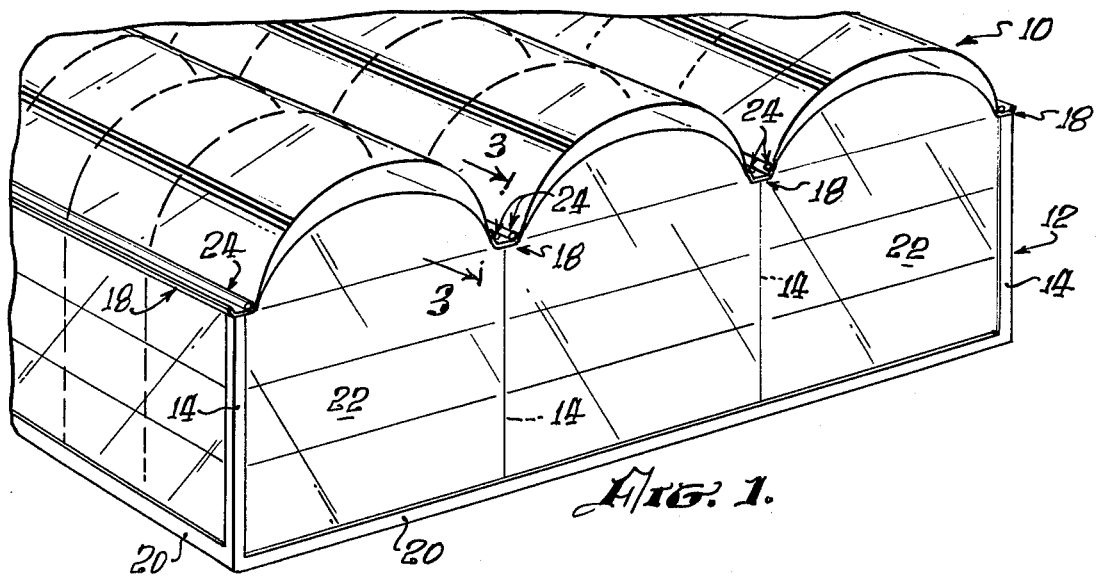
*Fig. 1.*
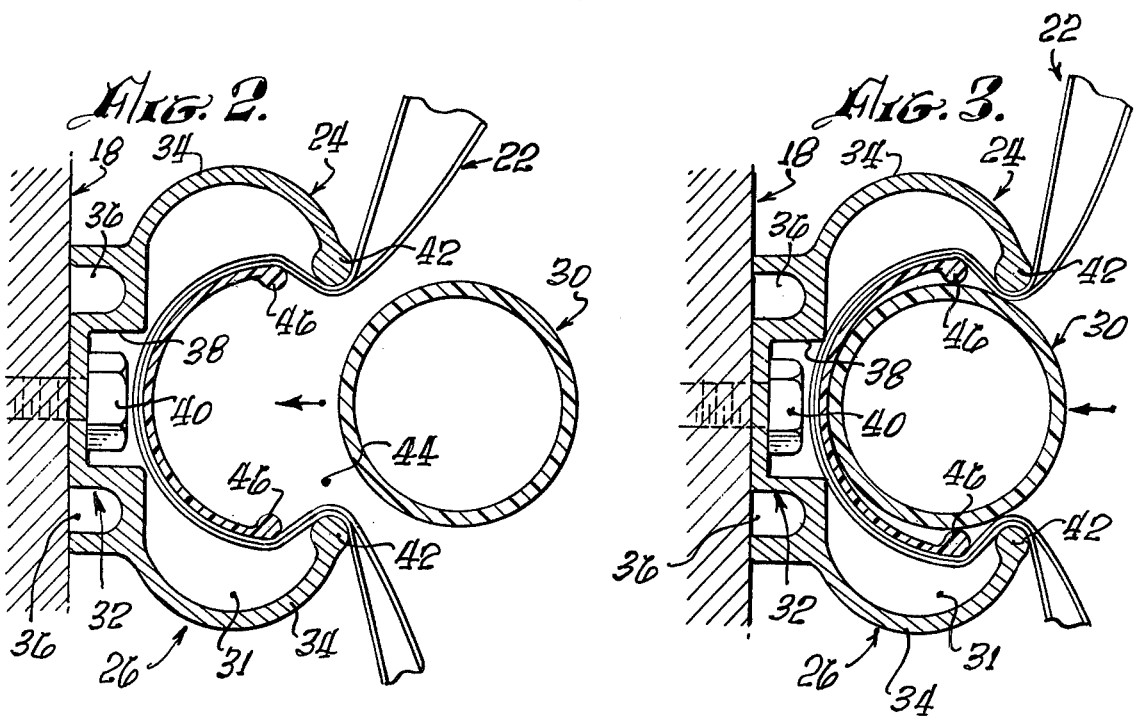
*Fig. 2.*  *Fig. 3.*
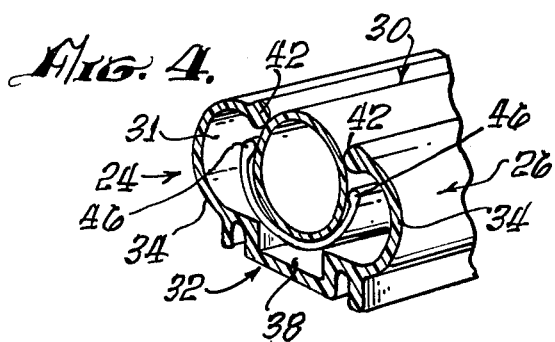
*Fig. 4.*

U.S. Patent   Aug. 1, 1978   Sheet 2 of 2   4,103,401
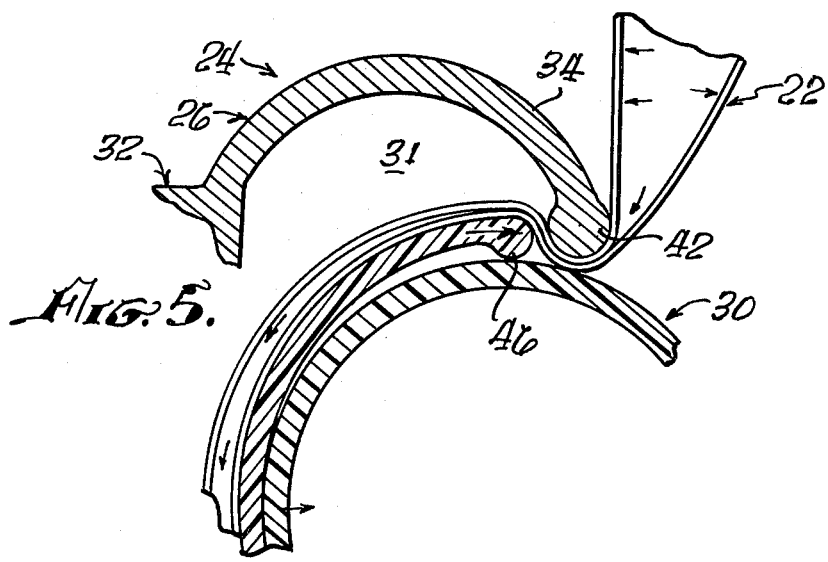
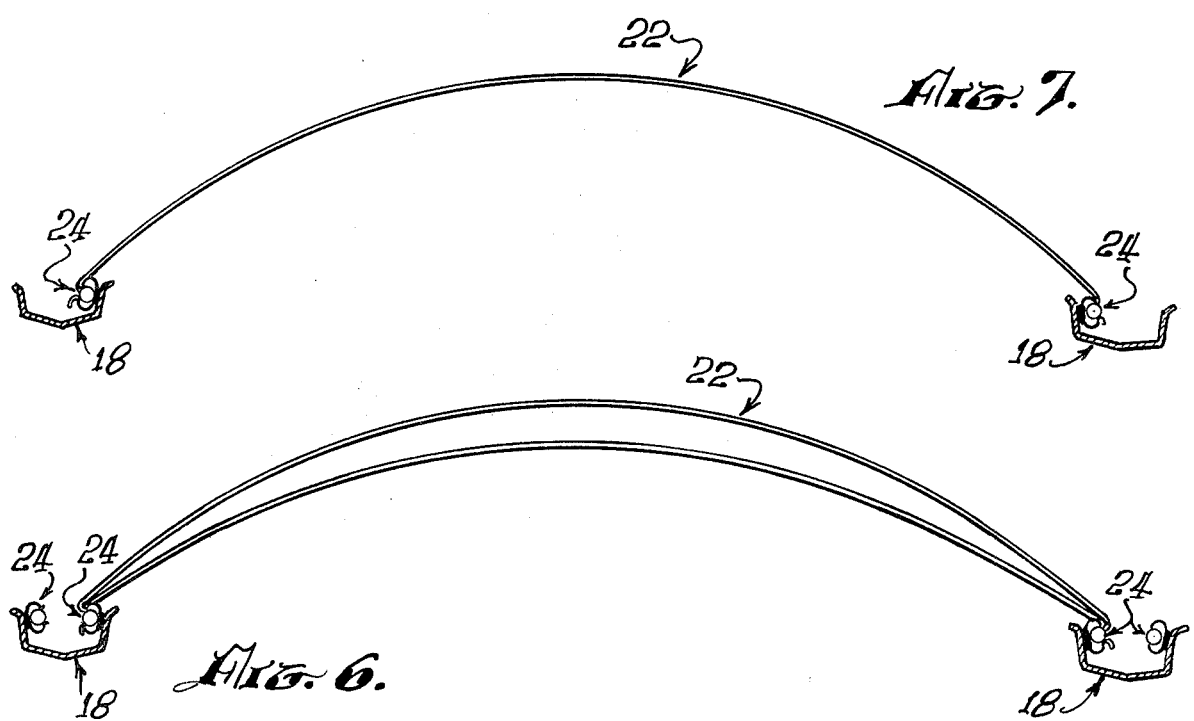

SHEET GRIPPING ASSEMBLY

RELATED APPLICATIONS

Reference is made to my copending application Ser. No. 556,695, filed Mar. 10, 1975, entitled "Gripping Assembly" now abandoned.

BACKGROUND OF THE INVENTION

1. Field of the Invention

This invention relates generally to the attachment of thin pliable sheet material, such as plastic film, to a support, such as an enclosure frame work. More particularly, the invention relates to an improved sheet gripping assembly for this purpose.

2. Prior Art

As will appear from the later description, the improved sheet gripping assembly of the invention is capable of many diverse sheet gripping applications involving a wide variety of sheet or sheet-like materials. However, the present gripping assembly is intended primarily for use in the construction of a greehouse of the class which comprises plastic film or sheet material covering and supported by an open frame structure. The invention will be described in connection with this particular application.

One existing method of greenhouse construction involves the erection of an open frame structure from pipes, tubes or the like, some of which are installed upright with their lower ends anchored to the ground to form vertical supporting posts or columns and others of which span the upper ends of the posts to form an overhead framework. Over this frame structure are stretched plastic sheets or films to form a weather and wind resistent covering or skin which is transparent to the sun's ultra-violet radiation.

One essential element of such a greenhouse construction is a means for firmly but releasibly securing the plastic film to the frame structure, such that the film will remain firmly in place under relatively high winds and yet may be quickly and easily replaced when necessary. A variety of film attachment techniques have been devised for this purpose. One of the more widely used techniques involves the sheet gripping assembly described in U.S. Pat. No. 3,803,671. Simply stated, this patented sheet gripping assembly comprises a channel-like base which is firmly attached to the greenhouse frame structure and a removable sheet holding member or bar insertable laterally into the channel of the base through an open side of the channel. In use, the sheet holding bar is removed and the plastic film is placed across the open side of the base and then pushed through the open side into the channel to form essentially a fold in the channel. The holding bar is inserted through the open side of the channel into this fold in such a way as to firmly grip the plastic film between the base and holding bar.

Sheet gripping assemblies of this general type suffer from one disadvantage which this invention overcomes. This disadvantage resides in the fact that tension force in the sheet material tends to, and in the case of the existing sheet gripping devices often does, dislodge the sheet holding or gripping bars from the hose channel through its open side. This tension force may result from wind loads on the sheet material or plastic film, thermal deformations in the sheet material, and so on.

Also, in some applications, the sheet material or plastic film has a double wall thickness with entrapped air between the two walls. Thermal expansion of this air creates tension stress in the sheet material tending to dislodge the sheet gripping bar. In addition, air often collects in a pocket between the base and the gripping bar in such a way that thermal expansion of this air packet exerts an outward dislodging force on the gripping bar.

My earlier mentioned copending application Ser. No. 556,695 discloses an improved sheet gripping assembly which tends to avoid the above problems. This invention provides a further improved and simplified sheet gripping assembly which avoids such problems.

SUMMARY OF THE INVENTION

The improved sheet gripping assembly of this invention avoids the problems discussed above associated with the prior art sheet gripping assemblies. To this end, the improved sheet gripping assembly has a channel-like base member containing a longitudinal, laterally opening channel bounded along its sides by side walls on the base member. These side walls have sheet gripping edges which bound longitudinally the side opening of the hose member channel. Insertable into this channel through its side opening are a pair of sheet gripping members including a laterally opening gripping channel member and a gripping bar member.

The sheet gripping channel member has a major lateral dimension exceeding the width of the base member side opening. The open side of this member is bounded longitudinally by sheet gripping edges on the member.

The gripping bar member also has a major lateral dimension exceeding the width of the base member side opening. This bar member is shaped and sized to fit closely within and to protrude through the open side of the gripping channel member in a manner such that the bar member resists lateral deflection of the channel gripping edges toward one another.

Certain of these members are laterally resilient to permit the gripping members to be forced through the side opening of the base member into the base member channel. In the particular embodiment described, the base member is constructed of relatively rigid material, such as metal, so that its channel side walls, which are arcuate, are relatively non-flexible, the sheet gripping channel member is constructed of a relatively resilient material, such as plastic, and has a generally semi-cylindrical shell-like shape. The sheet-gripping bar member has a cylindrical tubular shape and, like the channel member, is constructed of a resilient material, such as plastic. The two gripping members are thus laterally resilient, such that they may be deformed for insertion into the base member channel through its open side.

In use of the gripping assembly, the base member is fixed to a support, such as a greenhouse enclosure frame work. Plastic film to be secured to the support is then tucked or folded into the base member channel through its side opening, after which the gripping members are forced into the channel, gripping channel member first.

When thus assembled, the sheet material is gripped between the gripping bar member and the sheet gripping edges on and bounding the side opening of the base member. This provides a primary sheet gripping action in the gripping assembly. An additional sheet gripping action occurs in response to tension forces in the sheet material which tend to dislodge the gripping members from the base member channel through its side opening. Thus, these tension forces, which may be created by thermal expansion of air between double walls or layers of sheet material, as explained earlier, urge the gripping members outwardly from the channel until the gripping edges on the gripping channel member abut the gripping edges on the base member to grip the sheet material therebetween and prevent dislodging of the gripping members from the channel. The gripping bar member resists deflection of the channel gripping edges toward one another and thus retain these edges in sheet gripping relation to the gripping edges on the base member.

BRIEF DESCRIPTION OF THE DRAWINGS

FIG. 1 is a perspective view of a plastic film covered greenhouse enclosure embodying sheet gripping assemblies according to the invention;

FIG. 2 is an enlarged section through one gripping assembly taken on line 2—2 in FIG. 1, showing the assembly at an intermediate stage of attaching a plastic film to the assembly;

FIG. 3 is a section similar to FIG. 2 at the conclusion of the plastic film attaching operation;

FIG. 4 is a perspective view on reduced scale of the gripping assembly;

FIG. 5 is an enlarged fragmentary section through the gripping assembly showing its secondary sheet gripping action; and FIGS. 6 and 7 are sections illustrating the manner in which the plastic sheets or films which cover the greenhouse in FIG. 1 are stressed in tension.

DESCRIPTION OF THE PREFERRED EMBODIMENT

Referring first to FIG. 1 of the drawings, the illustrated greenhouse 10 comprises an open frame structure 12. This frame structure includes uprights 14 (only a few shown) joined and bridged at their upper ends by overhead channel-like beams 18. About the base perimeter of the frame structure are sill members 20. Covering the frame structure 12 is sheet material in the form of plastic film 22 which is transparent to the sun's radiation. The plastic film is secured to the frame structure by sheet gripping assemblies 24 according to the invention which extend along the beams 18 and the sill members 20. Except for these gripping assemblies, the greenhouse construction is conventional. Accordingly, no further description of the greenhouse per se is required.

Turning now to FIGS. 2–5, the sheet gripping assembly 24 of the invention comprises an elongate channel-like base member 26 and a pair of sheet gripping members 28, 30 for insertion into the base member in the manner explained later. Briefly, in use of the gripping assembly, the base member 26 is fixed to a support, in this instance the greenhouse frame structure 12. Sheet material to be attached or anchored to the support, in this instance the plastic film 22, is tucked into the base member, after which the gripping members 28, 30 are inserted into the base member, as shown in FIGS. 2 and 3, to firmly secure the film to the base member.

Referring in more detail to the drawings, the channel-like base member 26 contains a longitudinal laterally opening channel 31 bounded by a base wall 32 and side walls 34 of the base member. The base wall 34 is essentially a flat wall whose outer seating side has longitudinal recesses 36 adjacent its longitudinal edges. Entering the inner side of the base wall along its longitudinal center line is a recess 38. Holes extend through the bottom of this center recess to receive bolts 40 for attaching the base member 26 to its support.

The base member side walls 34 are integrally joined to the base wall 32 along the longitudinal edges of the base wall. These side walls arch inwardly toward one another and are generally cylindrically curved in the particular embodiment illustrated. Side walls 34 have longitudinal sheeting gripping edges 42 which are spaced to provide therebetween a longitudinal side opening 44 to the base member channel 31. Gripping edges 42 have a rounded bead-like shape. Base member 26 may be extruded or otherwise fabricated from suitable material, as discussed later.

Sheet gripping member 28 has an open channel-like shape and is referred to herein as a gripping channel member or simply a gripping channel. The longitudinal edges of this gripping channel are rounded to form bead-like sheet gripping edges 46. In the particular embodiment illustrated, the gripping channel 28 is generally semi-cylindrical in cross-section and, like the base member 26, may be extruded from suitable material as explained later. The gripping channel has a major lateral dimension, that is a width measured at the sheet gripping edges 46, exceeding the width of the base member channel side opening 44. The gripping channel is sized to fit within the base member channel 31 behind its gripping edges 42 in the position shown in FIGS. 2 and 3.

The second sheet gripping member 30 is a gripping bar having a major lateral dimension exceeding the width of the base member channel side opening 44. This gripping bar member is shaped and sized to fit closely within the gripping channel 28 in the manner shown in FIG. 3. When thus positioned in the gripping channel 28 and within the base member channel 31, the gripping bar bears against the channel sheet gripping edges 46 to resist lateral deflection of these edges toward one another and against the base member gripping edges 42 to grip the sheet material or plastic film 22 in the manner explained later. In the particular embodiment shown, the gripping bar has a hollow tubular cross-section.

As noted above, each gripping member 28, 30 has a major lateral dimension exceeding the width of the base member channel side opening 44. Certain of these members are laterally resilient to permit lateral insertion of the gripping members into the base member channel 31 through the channel side opening, as shown. In the particular embodiment shown, the base member 26 is constructed of relatively rigid material, such as plastic, whereby the base side walls 34 are relatively stiff. The sheet gripping channel 28 and bar 30 are constructed of a relatively resilient material, such as plastic, to permit lateral deformation of the gripping members sufficient to permit insertion of these members into the base channel 31 through its side opening 44.

The sheet material or plastic film 22 is secured to a sheet gripping assembly 24 by first tucking the film into the base channel 31 through its side opening 44. The gripping members 28, 30 are then inserted into the base channel, gripping channel 28 first, to the sheet gripping positions of FIG. 3. In these positions, the plastic film 22 extends through the channel 31 between the base member walls 32, 34 and the gripping members 28, 30. The film is gripped between the gripping edges 42 on the base member 26 and the sheet gripping bar 28.

A primary feature of the present gripping assembly resides in the fact that it resists dislodging of the sheet gripping members 28, 30 from the base member channel 31 through its side opening 44 under the force of tension in the plastic film 22. In this regard, it will be seen in FIGS. 2 and 3 that tension force in the plastic film 22 tends to urge the gripping members 28, 30 outwardly from the base channel 31 through its side opening. This outward movement of the gripping members bring the gripping channel edges 46 into contact with the base member gripping edges 42 to further grip the film 22 between these edges and prevent the gripping members from being forced out of the base member 31. The gripping bar member 30 prevents deflection of the gripping channel edges 46 inwardly out of contact with the base member edges 42.

In the greenhouse application of FIG. 1, the sheet gripping assemblies 24 are mounted on the frame structure 12 in the manner mentioned earlier and shown in the drawings. In some cases, the plastic film 22 will have a single thickness, as shown in FIG. 7 and in other cases a double thickness, as shown in FIG. 8. Wind loads on this plastic film will produce tension forces in the film which tend to dislodge the sheet gripping members 28, 30 from the base member channel 31. In the case of the double thickness film in FIG. 8, thermal expansion of air between the two film layers also produces tension forces in the film which tends to dislodge the sheet gripping members 28, 30. The gripping members are restrained from being forced out of the channel in the manner explained above.

The inventor claims:

1. A sheet gripping assembly for thin pliable sheet material such as plastic film, comprising:
    an elongate channel-like base member containing a longitudinal, laterally opening channel bounded along its sides by side walls on the member having sheet gripping edges bounding the side opening of the channel,
    an elongate sheet gripping channel member having an open longitudinal side bounded by longitudinal sheet gripping edges on the channel member and a major lateral dimension greater than the width of said base member side opening,
    an elongate gripping bar member having a major lateral dimension greater than the width of said base member side opening and shaped to fit closely within said gripping channel member with the bar member protruding through the open side of said channel member to resist lateral deflection of said channel member edges toward one another, and
    certain of said members being laterally resilient whereby said gripping members may be inserted channel member first into said base member channel through said base member side opening with sheet material extending through the channel between said channel walls and said gripping members and to sheet gripping positions behind said base member gripping edges wherein said gripping bar member fits within said gripping channel member, said sheet material is gripped between said base member gripping edges and said gripping bar member, and tension force in said sheet material tending to dislodge said gripping members from said base member channel through said base member side opening urges said gripping channel member outwardly to engage said gripping channel edges with said base member gripping edges, thereby further gripping the sheet material and preventing dislodging of said gripping members from said base member channel.

2. The sheet gripping assembly of claim 1 wherein:
    said gripping members are resilient for insertion into said base member channel through said base member side opening by lateral deformation of said gripping members.

3. The sheet gripping assembly according to claim 1 wherein:
    said base member channel side walls are arcuate in cross section and curve inwardly toward one another,
    said gripping channel member has an arcuate open channel-like cross section, and
    said gripping bar member has a rounded cross section.

4. The sheet gripping assembly according to claim 3 wherein:
    said gripping channel member is laterally resilient and has a generally semi-cylindrical cross section, and
    said gripping bar member is laterally resilient and has a tubular cylindrical cross section.

5. The sheet gripping assembly according to claim 1 wherein:
    said gripping members are laterally resilient.

6. The sheet gripping assembly according to claim 1 wherein:
    said base member has a base wall for seating against a support, and means for securing said base wall to the support.

7. The sheet gripping assembly according to claim 1 wherein:
    said base member gripping edges and said gripping channel edges have rounded bead-like cross sections.

8. The sheet gripping assembly of claim 7 wherein:
    said base member channel side walls are arcuate in cross section and curve inwardly toward one another and said channel member is constructed of a relatively rigid material such as metal, whereby said side walls are relatively non-flexible,
    said gripping channel member has an open generally semi-cylindrical channel-like cross section and is constructed of a relatively resilient material such as plastic to permit lateral deformation of said channel member for insertion into said base member channel through said base member open side, and
    said gripping bar member has a generally cylindrical tubular cross section and is constructed of a relatively resilient material such as plastic to permit lateral deformation of said bar member for insertion into said base member channel through said base member open side.

* * * * *